US005212951A

United States Patent [19]

Fargo et al.

[11] Patent Number: 5,212,951

[45] Date of Patent: May 25, 1993

[54] HYDRAULIC ELEVATOR CONTROL VALVE

[75] Inventors: Richard N. Fargo, Plainville, Conn.; Bennie J. Murah, Amherst, Mass.

[73] Assignee: Otis Elevator Company, Farmington, Conn.

[21] Appl. No.: 701,396

[22] Filed: May 16, 1991

[51] Int. Cl.[5] .................... F16D 31/02; F15B 13/044

[52] U.S. Cl. .................................... 60/479; 91/449; 91/459; 187/110; 187/29.2

[58] Field of Search ................ 60/477, 479, 431, 433, 60/434; 187/110, 111, 29.2; 91/454, 459, 443, 449, 450, 420

[56] References Cited

U.S. PATENT DOCUMENTS

| | | | |
|---|---|---|---|
| 4,249,641 | 2/1981 | Takenoshita et al. | 187/111 |
| 4,418,794 | 12/1983 | Manco | 91/459 |
| 4,593,792 | 6/1986 | Yamamoto | 187/29 B |
| 4,637,495 | 1/1987 | Blain | 187/111 |
| 4,674,527 | 6/1987 | Fossati et al. | 187/110 |
| 4,676,140 | 6/1987 | Haussler | 60/477 |
| 4,697,498 | 10/1987 | Yoshikawa et al. | 91/420 |
| 4,775,031 | 10/1988 | Nakamura | 187/111 |
| 4,785,915 | 11/1988 | Shah et al. | 187/110 |
| 4,830,130 | 5/1989 | Miyoshi | 91/420 |
| 4,976,338 | 12/1990 | Holland | 187/110 |
| 5,014,823 | 5/1991 | Pelto-Huikko | 187/29.2 |
| 5,014,824 | 5/1991 | Fargo | 187/29.2 |

FOREIGN PATENT DOCUMENTS

| | | | |
|---|---|---|---|
| 45-81227 | 9/1970 | Japan . | |
| 55-10512 | 3/1980 | Japan . | |
| 63-215289 | 8/1988 | Japan . | |
| 0275385 | 11/1989 | Japan | 187/29.2 |

*Primary Examiner*—Edward K. Look

*Assistant Examiner*—Hoang Nguyen

*Attorney, Agent, or Firm*—Lloyd D. Doigan

[57] ABSTRACT

According to the invention, a valve for use with a variable speed motor and pump in an hydraulic elevator balances a fluid pressure force on a pump side of a control valve with a fluid pressure force on a cylinder side of the control valve before an elevator cab moves either upwardly or downwardly. On the pump side of the valve, a separate circuit, which is controlled by a solenoid, directs the pump fluid pressure force behind the valve until the sum of the fluid pressure acting on the pump side of the control valve overcomes the fluid pressure on the cylinder side of the control valve to open the valve.

10 Claims, 1 Drawing Sheet

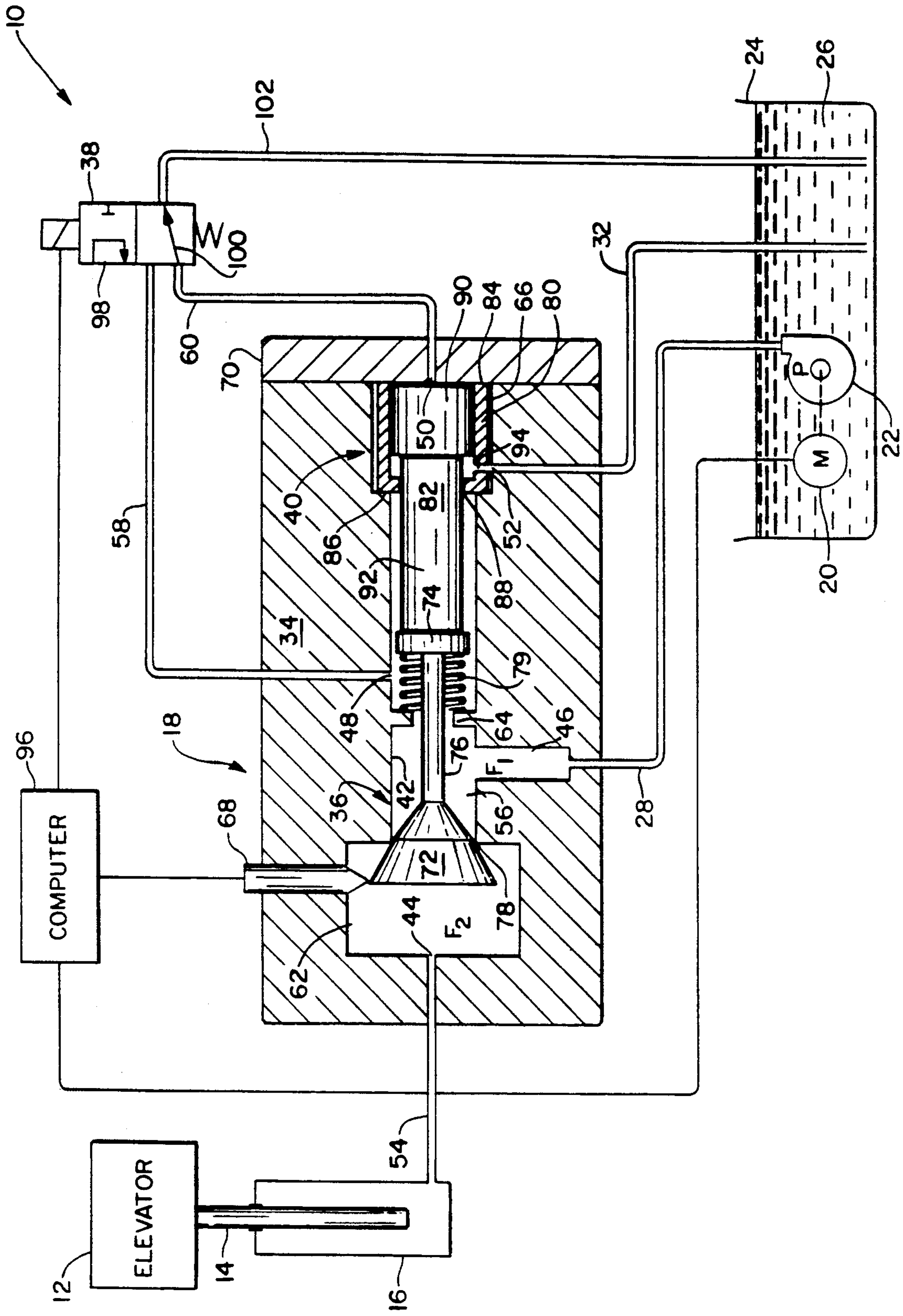
COMPUTER
ELEVATOR

HYDRAULIC ELEVATOR CONTROL VALVE

DESCRIPTION

1. Technical Field

This invention relates to an hydraulic elevator and more particularly to a valve used with a hydraulic elevator powered by a variable speed motor.

2. Background Art

Hydraulic elevators are comprised of a cab, a plunger attached to the cab either directly or by means of a roping configuration, and a cylinder housing the plunger. Hydraulic fluid is impelled into the cylinder to drive the plunger, and the cab attached thereto, upwardly. The fluid is typically impelled into the cylinder by means of a constant speed motor which drives a fixed displacement pump.

This type of hydraulic elevator requires valves to control cab speed during acceleration and levelling and to lower the elevator. The valves waste energy while controlling the motion of the elevator by discharging excess fluid flow. Valves may also be noisy and provide relatively poor control.

Some hydraulic elevators utilize a variable speed pump and motor. In this type of elevator, hydraulic fluid is impelled into and out of the cylinder to drive the plunger, and the cab attached thereto, upwardly and downwardly. The variable speed pump and motor are known to reduce the control problems and greatly simplify the number of valves. However, a valve is still required to maintain the elevator at a landing.

DISCLOSURE OF THE INVENTION

It is an object of the invention to provide a hydraulic elevator driven by a variable speed pump and motor with a valve which allows the elevator to operate safely.

It is a further object of the invention, to provide a valve which allows the elevator cab to descend without jolting the passengers within the elevator.

It is a further object of the invention to provide a valve which signals an elevator control that the start of an uprun or downrun may commence safely.

According to the invention, a valve for communicating a variable fluid pressure force in an hydraulic elevator is provided in which fluid pressure on a pump side of the valve is balanced with the fluid pressure on a cylinder side of the valve before an elevator cab moves either upwardly or downwardly.

The valve is disposed in the line passing fluid between a variable speed pump and the cylinder. A fluid pressure force from the pump acts upon one side of the valve. A fluid pressure force of fluid in the cylinder acts upon the other side of the valve. On the pump side of the valve, a separate circuit, which may be controlled by a solenoid, directs the pump fluid pressure force behind the valve until the sum of the fluid pressure acting on the pump side of the valve overcomes the fluid pressure on the cylinder side of the valve to open the valve.

By balancing the pressure on the valve on the pump and cylinder sides of the valve, before opening the valve, the elevator cab may start to descend gently and safely without jolting the passengers within the cab. Without balancing the pressure the cab may descend quickly because of the large pressure drop between the cylinder side and the pump side of the valve. A quick descent may be difficult to control, may jolt the passengers, and may be unsafe.

Further, the elevator may not descend if the motor is not, at least initially, providing power to the pump. This feature minimizes the probability that the elevator descends without motor control.

These and other objects, features, and advantages of the present invention will become more apparent in light of the following detailed description of a best mode embodiment thereof, as illustrated in the accompanying drawing.

BRIEF DESCRIPTION OF THE DRAWING

The figure is a schematic diagram, partly in section, of an embodiment of a valve used with a variable speed motor and pump in a hydraulic elevator.

BEST MODE FOR CARRYING OUT THE INVENTION

The elevator system 10 is comprised of an elevator car 12, a plunger 14, a hydraulic cylinder 16, a valve 18, and a conventional variable speed, reversible motor 20 and pump 22. The pump and motor are disposed within a tank 24 which is filled with hydraulic fluid 26. As is known in the art, the motor powers the pump to provide a fluid pressure force ("FPF") to raise and lower the elevator. The system may also include a pressure relief valve and a manual lowering valve (not shown) as known in the art.

A first FPF $F_1$ of the pump is communicated between the valve 18 and the pump 22 via line 28. A second FPF $F_2$ is communicated between the valve and the hydraulic cylinder 16 via line 30. A drain pressure line 32 is provided between the valve and the tank 24.

THE VALVE

The valve 18 is comprised of a housing 34, a check valve 36, a solenoid valve 38, and an activation assembly 40.

THE HOUSING

The housing 34 has a central bore 42 which communicates with a cylinder port 44, a pump port 46, a first solenoid port 48, a second solenoid port 50 and a drain port 52. The cylinder port 44 communicates hydraulic fluid and the second $F_2$ via line 30 to the left side of the bore 42 as shown in the Figure. The pump port 46 communicates hydraulic fluid and the first FPF $F_1$ via line 28 to a central area of the bore 56. The first solenoid port 48 communicates the first FPF $F_1$ to the solenoid 38 via line 58 and the second solenoid port 50 communicates that FPF from the solenoid to the activation assembly 40 via line 60. The drain port 52 communicates tank (or drain) pressure via the drain pressure line 32.

The housing 34 has a first area 62 of increased diameter relative to the central bore 42 for housing the check valve 36, a flange 64 extending radially inwardly into the bore (and defining an opening therethrough) acting as a spring seat, and a second area 66 of increased diameter relative to the central bore which houses the activation assembly 40. A conventional position sensor 68 extends through the housing into the first area. The housing has an end cover 70 which may be attached to the housing by conventional means such as threads or bolts (not shown).

THE CHECK VALVE

The check valve 36 comprises a frustoconical portion 72, a disc-shaped spring seat 74, and a rod 76 fixedly connecting the frustoconical portion and the spring seat. The rod extends through the central portion of the bore and through the opening defined by the flange 64. A spring 79 encircles the rod and abuts the spring seat 74 and the flange 64. The frustoconical portion 72 abuts the position sensor 68 when seated against a circumference 78 of the central bore 42.

THE ACTIVATION ASSEMBLY

The activation assembly 40 is comprised of a cylinder 80 disposed in the second area 66, and a piston 82 disposed in the cylinder. The cylinder 80 has an open first end 84 for receiving the first FPF $F_1$ from line 60 and a closed second end 86 having an aperture 88 through which the piston extends. The piston 82 comprises a head 90 fitting within the cylinder and a shaft 92 extending through the aperture 88. The shaft abuts the spring seat 74 of the check valve 76. The cylinder has an opening 94 on the shaft side of the piston head which communicates with the drain port 52. For ease of manufacture, the piston head 92 and shaft 92 may comprise separate pieces.

THE SOLENOID VALVE

The solenoid valve 38, as is conventionally known, is controlled by a computer 96. The solenoid has a first circuit 98 by which fluid is communicated from line 58 to line 60 to communicate the first FPF $F_1$ to the activation assembly 40 and a second circuit 100 by which hydraulic fluid is communicated from cylinder 80 to the tank 24 via line 60 and line 102. The solenoid must be energized by the computer to utilize the first circuit. If the solenoid is not energized, or loses power, the second circuit is utilized. When the second circuit 100 is utilized the first FPF $F_1$ can not be communicated to the activation assembly.

OPERATION

When the cab 12 is at rest at a landing (not shown), the frustoconical portion 72 of the check valve 36 is seated against the circumference 78 to prevent hydraulic fluid from flowing through the valve 18 from the cylinder to the tank via line 30 and line 28, thereby maintaining the cab at the landing.

If it is desired to move the cab to a lower landing, the computer 96 energizes the solenoid 38 to activate the first circuit 98 thereby allowing the first FPF $F_1$ to be communicated to the open end 84 of the cylinder 80 through the central bore 42, first solenoid port 48, line 58, line 60, second solenoid port 50, and to the piston head 90 in the cylinder 80. The piston is urged by the first FPF against the spring seat which is connected to the frustoconical portion 78 via the rod 76. The computer also activates the motor 20 to increase the first FPF.

The frustoconical portion 72 remains seated against the circumference 78 until the sum of the first FPF on the frustoconical portion 72 and the piston head 90 overcomes the second FPF $F_2$ and the spring force of the spring 79. When the sum of the first FPFs exceed the sum of the second FPF and the spring force of the spring, the frustoconical portion is unseated from the circumference 78 thereby opening the check valve. Essentially, the check valve is opened when the first FPF is approximately equal to the second FPF.

Once the valve 18 is opened, the position sensor 68 alerts the computer 96 that the variable speed motor 20 may then be controlled to follow a chosen speed profile to lower the cab 12 to the next landing. Such a profile may allow the motor to gradually slow to control the downward rate of acceleration, go into reverse (thereby generating energy) and then reverse again to slow the cab as it approaches the desired landing.

In an emergency, such as a loss of power, or if it is desired to hold the cab 12 at a landing, the solenoid 38 is deenergized by the computer 96. The first FPF is shut off from the piston head as the second circuit 100 of the solenoid is activated. The fluid acting upon the piston head is ported to drain via second solenoid port 50, line 60, the second circuit 100, and line 102. The sum of the first FPFs acting upon the check valve no longer overcome the second FPF and the spring force acting thereon. The second FPF and the spring force of the return spring act to seat the frustoconical portion 72 upon the circumference 78 thereby stopping flow of fluid from the cylinder 16 and the descent of the cab 12.

If it is desired to raise the cab 12, the motor 20 is controlled by the computer to increase the first FPF upon the check valve. When the force of the first FPF is greater than the second FPF and the spring force, the check valve pops open. The position sensor 68 sends a signal to the computer that the first and second FPFs are approximately equal and that an uprun may commence. The computer then controls the motor according to a desired uprun profile, as is known in the art.

By balancing the fluid pressure on the pump and cylinder sides of the valve, before opening the valve, the elevator cab may start to descend gently and safely without jolting the passengers within the cab. Without balancing the fluid pressure, the cab may descend quickly because of the large pressure drop between the cylinder and pump sides of the valve. A quick descent may be difficult to control, may jolt the passengers, and may be unsafe. Further, the cab may not descend if the motor is not, at least initially, providing power to the pump. The pump FPF is not great enough to open the check valve without the motor providing a certain amount of torque to the pump. This feature minimizes the probability that the elevator descends without motor control for braking.

Although the invention has been shown and described with respect to a best mode embodiment thereof, it should be understood by those of ordinary skill in the art that the foregoing and various other changes, omissions and additions in the form and detail thereof may be make herein without departing from the spirit and scope hereof. One of ordinary skill in the art will appreciate that the valve will function with any variable fluid pressure force whether provided by a variable speed motor and fixed displacement pump, constant speed motor and variable displacement pump, or other means.

We claim:

1. An hydraulic elevator comprising:

a cab, a plunger attaching to said cab, a cylinder for translatingly receiving said plunger, a pump means for communicating a variable fluid pressure force ("FPF") to said cylinder, and a valve for communicating said variable FPF between said pump and said cylinder, said valve communicating said variable FPF for different magnitudes of variable FPF, said valve comprising:

a check valve for preventing a flow of said variable FPF between said pump and said cylinder, and a circuit means for directing said FPF upon said check valve to urge said check valve to open against a cylinder FPF if said pump FPF is approximately equal to said cylinder FPF, said circuit means urging said check valve to open if no emergency condition exists and it is desired to lower the cab.

2. The hydraulic elevator of claim 1 wherein said circuit means comprises:

a solenoid valve which is energized to direct said variable FPF upon said check valve and deenergized to stop directing said variable FPF upon said check valve.

3. The hydraulic elevator of claim 1 wherein said circuit means comprises:

a second circuit means for preventing said pump FPF from porting to said valve so that said check valve does not open if it is desired to maintain said cab at a landing or if an emergency condition exists.

4. An hydraulic elevator comprising:

a cab, a plunger attaching to said cab, a cylinder for translatingly receiving said plunger, a pump for communicating a variable FPF to said cylinder, a variable speed motor for providing power to said pump, and a valve for porting FPF from said pump to said cylinder, said valve communicating said variable FPF for different magnitudes of variable FPF comprising;

a check valve for preventing a flow of fluid or FPF between said pump and said cylinder, a first circuit means for porting a pump FPF upon said check valve to urge said check valve to open against a cylinder FPF, said first circuit means urging said check valve to open if no emergency condition exists and if it is desired to lower the cab, and a second circuit means for stopping the porting of the pump FPF upon said check valve to allow thee cylinder FPF to close the check valve, said second circuit means urging said check valve to close if an emergency condition exists and if it is desired to maintain the cab at a given position.

5. The hydraulic elevator of claim 4 further comprising:

a solenoid valve incorporating portions of said first circuit means and said second circuit means said first circuit means being activated when said solenoid valve is energized, said second circuit means being activated when said solenoid valve is not being energized.

6. Method for lowering an hydraulic elevator having a cab, a plunger attaching to said cab, a cylinder for translatingly receiving said plunger, a first valve for controlling the flow of fluid to and from the cylinder, and a variable speed motor and pump for providing a variable fluid pressure force, said method characterized by the steps of:

porting a pump FPF from said pump to a second valve, energizing said second valve to port said pump FPF to said first valve to effectuate opening said first valve if it is desired to lower said cab, and opening said first valve when the pump FPF is equal to or greater than a cylinder FPF.

7. Method for lowering an hydraulic elevator having a cab, a plunger attaching to said cab, a cylinder for translatingly receiving said plunger, a first valve for controlling the flow of fluid to and from the cylinder, and a variable speed motor and pump for providing a variable fluid pressure force, said method characterized by the steps of:

porting a pump FPF ("FPF") from said pump to a second valve, energizing said second valve to port said pump FPF to said first valve to open said first valve if it is desired to lower said cab, and opening said first valve when the pump FPF exceeds a cylinder FPF, or deenergizing said second valve to stop porting said pump FPF if an emergency exits or it is desired to stop downward motion of said cab, and closing said first valve when the cylinder FPF exceeds the pump FPF.

8. Method for lowering an hydraulic elevator having a cab, a plunger attaching to said cab, a cylinder for translatingly receiving said plunger, a first valve for controlling the flow of fluid to and from the cylinder, and a variable speed motor and pump for providing a variable fluid pressure force, said method characterized by the steps of:

porting a pump FPF from said pump to a second valve, energizing said second valve to port said pump FPF to said first valve to effectuate opening said first valve if it is desired to lower said cab, opening said first valve when the pump FPF is equal to or greater than a cylinder FPF and maintaining said first valve open as said first valve communicates said variable fluid pressure force.

9. Method for lowering an hydraulic elevator having a cab, a plunger attaching to said cab, a cylinder for translatingly receiving said plunger, a first valve for controlling the flow of fluid to and from the cylinder, and a variable speed motor and pump for providing a variable fluid pressure force, said method characterized by the steps of:

porting a pump FPF ("FPF") from said pump to a second valve, energizing said second valve to port said pump FPF to said first valve to open said first valve if it is desired to lower said cab, and opening said first valve when the pump FPF exceeds a cylinder FPF, and maintaining said first valve open as said first valve communicates said variable fluid pressure force, or deenergizing said second valve to stop porting said pump FPF if an emergency exists or it is desired to stop downward motion of said cab, and closing said first valve when the cylinder FPF exceeds the pump FPF.

10. An hydraulic elevator comprising:

a cab, a plunger attaching to said cab, a cylinder for translatingly receiving said plunger, a pump means for communicating a variable fluid pressure force ("FPF") to said cylinder, and a valve means for communicating said variable FPF between said pump and said cylinder, said valve means opening to communicate said variable FPF to said cylinder if said variable FPF is approximately equal to a cylinder FPF, said valve remaining open for all variable FPF magnitudes, said valve means closing if an emergency condition exists and it is not desired to lower the cab.

* * * * *